United States Patent [19]

Muller et al.

[11] Patent Number: 4,990,783

[45] Date of Patent: Feb. 5, 1991

[54] RANGE INSENSITIVE INFRARED INTRUSION DETECTOR

[75] Inventors: Kurt A. Muller, Stafa; Hansjurg Mahler, Hombrechtikon, both of Switzerland

[73] Assignee: Cerberus A.G., Switzerland

[21] Appl. No.: 409,142

[22] Filed: Sep. 19, 1989

[30] Foreign Application Priority Data

Sep. 22, 1988 [CH] Switzerland ........................ 3508/88

[51] Int. Cl.[5] ........................ G01J 5/08; G08B 13/18

[52] U.S. Cl. ........................ 250/353; 250/342

[58] Field of Search ........................ 250/353, 338.1, 221, 250/342; 340/567, 600

[56] References Cited

U.S. PATENT DOCUMENTS

| | | | |
|---|---|---|---|
| 4,339,748 | 7/1982 | Guscott et al. | 340/555 |
| 4,625,115 | 11/1986 | Guscott | 250/353 |
| 4,709,152 | 11/1987 | Müller et al. | 250/342 |
| 4,734,585 | 3/1988 | Owers | 250/353 |
| 4,752,769 | 6/1988 | Knaup et al. | 340/567 |
| 4,769,545 | 9/1988 | Fraden | 250/353 |
| 4,841,284 | 6/1989 | Biersdorff | 340/567 |
| 4,880,980 | 11/1989 | Müller et al. | 250/353 |
| 4,893,014 | 1/1990 | Geck | 250/353 |
| 4,920,268 | 4/1990 | Walters et al. | 250/353 |

FOREIGN PATENT DOCUMENTS 0218055 9/1985 European Pat. Off. .

*Attorney, Agent, or Firm*—Brumbaugh, Graves, Donohue & Raymond

*Primary Examiner*—Constantine Hannaher
*Assistant Examiner*—Edward J. Glick

[57] ABSTRACT

An infrared detector is described for monitoring a corridor like room having a plurality of focusing means for the collection of infrared radiation emitted by an intruder. The field of view of each focusing means is oriented so as to form a continuous field of coverage in the space to be monitored, without gaps or areas of limited sensitivity. Furthermore, the solid angle subtended by each focusing means is chosen so that the sum of the energy received from the intruder in the monitored area and focused onto the infrared sensor by the multiple focusing means is insensitive to and independent of the range of the intruder from the monitoring device.

7 Claims, 3 Drawing Sheets

RANGE INSENSITIVE INFRARED INTRUSION DETECTOR

BACKGROUND OF THE INVENTION (a) Field of the Invention

This invention relates to an infrared intrusion detector useful in monitoring a corridor-like room comprising an infrared sensor for detecting a change of infrared radiation impinged on the infrared sensor by a passing intruder, a plurality of optical means mounted in front of said infrared sensor for receiving infrared radiation from the body of said intruder and focusing said radiation on said infrared sensor, and an evaluation means coupled to said infrared sensor for actuating a signal when said infrared sensor detects said radiation change.

(b) Discussion of the Prior Art

Infrared intrusion detectors are generally known; they detect the intrusion of a person or any object emitting infrared radiation in a supervised area.

For the supervision of corridor-like rooms, specially adapted infrared intrusion detectors are used having a relatively broad field of view in one plane and a relatively narrow field of view in a transverse plane. The broad field of view is usually in the vertical plane, with the narrow field of view being provided in the horizontal plane such that a curtain-like protection zone is provided. The protective curtain is arranged within a facility to be monitored such that an intruder must traverse this curtain to gain entrance into the facility and thereby trigger an intruder alarm. GB-A-No. 2,080,945 describes an infrared intrusion detector in which such a curtain is produced by a cylindrical mirror which is placed in front of the focusing mirror in order to obtain a wide vertical angle of view.

This infrared intrusion detector has a disadvantage in that it has a different sensitivity for objects in areas having different ranges from the detector.

In DE-Al-No. 31,14,112, a detector system based on infrared radiation is described, which avoids said disadvantage and achieves an approximately equal level of sensitivity to infrared radiation for all areas having different ranges from the detector. This is achieved by arranging three vertically displaced concave mirrors with an infrared sensor in their common focal point in such a way that each mirror provides coverage for a different angular region of space. For a given object (e.g. a person), each of the mirrors focuses an image of said object upon the sensor having substantially the same image size independent of the distance of said object from the detector. An object of a given size emitting infrared radiation is therefore detected approximately with the same probability of detection, and the sensitivity of the detector is approximately equal for all areas of coverage independent if their distance from the detector.

A disadvantage of this known infrared intrusion detector arrangement consists in the fact that the area to be supervised is not covered completely. Because of the gaps between the coverage areas dictated by the optical constraints, especially in front of the detector, such infrared intrusion detectors are not sufficiently safe against sabotage or against crawling intruders.

In EP-Al-No. 0'262'241 (corresponding to U.S. Pat. No. 4,740,701), it was suggested to provide an infrared detector having a field of detection in the form of sharply defined strips or elongate zones of substantially uniform sensitivity to infrared radiation without a gap by bending a thin cylindrical Fresnel lens in the longitudinal direction in such a way that the radius of curvature corresponds to its focal length. The infrared sensor is arranged approximately in the focal point of thus created cylindrical Fresnel lens. An advantage of this arrangement is that a protective curtain without a gap is obtained, but the disadvantage is that the sensitivity of the detector decreases with increasing distance from the detector. (The sensitivity of the detector is approximately inversely proportional to the distance from the infrared intrusion detector; see FIG. 7.)

SUMMARY OF THE INVENTION

Therefore, with the foregoing in mind, it is a primary object of the invention to provide a new and improved construction of an intrusion detecting apparatus which does not exhibit the aforementioned drawbacks and shortcomings of the prior art.

A further significant object of the invention is to provide a new and improved construction of an infrared intrusion detecting apparatus for forming a continuous curtain-like zone of protection without a gap, and capable of substantially uniform infrared radiation sensitivity across the entire field of coverage of the detection apparatus.

Yet another noteworthy object of the invention is to provide a new and improved construction of an apparatus for intrusion detection, as described hereinbefore, which apparatus provides a continuous coverage in the form of a wall with high immunity to crawling intruders, and which apparatus further provides a uniform, high sensitivity coverage over the entire area to be protected.

In order to implement these and other objects of the invention, which will become more readily apparent as the description proceeds, the intrusion detecting apparatus of the present invention is characterized by:

(1) a plurality of optical means mounted in front of the infrared sensor constructed and arranged in a plurality of vertically and/or horizontally displaced rows to focus infrared radiation emanated from a plurality of angular regions of space, (2) said angular regions of space defining a curtain-like pattern of zones of coverage vertically overlapping, covering the room to be monitored, (3) each of said optical focusing means defining a solid angle formed by the infrared sensor optical means, said solid angle of said optical means having a value varying with the range of the corresponding zone of coverage in such manner that the sum of the infrared energy focused by each optical means i.e. the integral of the radiation impinging upon the infrared sensor from a moving infrared target (an upright walking human being) is constant, independent of the target's range from the infrared detector.

According to one embodiment of an infrared intrusion detector of this invention, the optical focusing means are designed and arranged so that the size of the solid angles, are chosen (weighed) to be dependent on the range of the corresponding zone of coverage from the detector. Preferably, the solid angles of the optical means which are specially adapted to receive infrared radiation from those zones of coverage with the furthermost and the nearest ranges are the largest ones, and the solid angles of the optical means which are specially adapted to receive infrared radiation from zones of coverage having intermediate distances to the detector are the smallest. The reason for the different weighting of the solid angles is in the fact that a close or far intruder from the sensor crosses fewer individual zones of coverage than an intruder who trespasses in the middle ranges (see FIGS. 6 and 6a), so the energy contribution from each one of coverage has to be controlled. Preferably, the optical means consist of a number of parabolic mirrors, typically between seven and fifteen, with a common focus on the infrared sensor. Specifically, the solid angles are computed by assuming that an object, in this example B wide by L tall, is located distance DIST from the optical means. If the optical means is a parabolic mirror of focal length f and the object to be detected is near the axis of the mirror, then from FIG. 8A, the object of dimension where $$b = \frac{f \cdot B}{\text{Dist}} \quad (1)$$

$$l = \frac{f \cdot L}{\text{Dist}} \quad (2)$$

If the object is in the far field, the infrared energy collected by the mirror is approximately $$\text{const} \cdot \frac{A}{\text{Dist}^2} \quad (3)$$

Where A is the area of the optical means (mirror), and const is a constant. Now, the energy density at the mirror is the energy collected divided by the image size at the sensor $$\text{const} \cdot \frac{A}{\text{Dist}^2} \cdot \frac{1}{b \times l} \quad (4)$$

substituting for b and 1 from (1) and (2) above into (4)

$$\text{const} \cdot \frac{A}{\text{Dist}^2} \cdot \frac{\text{Dist}}{fB} \cdot \frac{\text{Dist}}{fL} = \frac{A}{f^2(B \times L)} \cdot \text{const}$$

That is, the energy collected is proportional to $$\frac{A}{f^2},$$

the solid angle of the parabolic mirror (near axis object), where f is the focal length of the mirror. Computed in a similar manner, for a parabolic mirror section of area A (off axis object), as in FIG. 8B, the energy density at the sensor is approximately $$\frac{A}{f^2} \cos \alpha \approx \text{solid angle of mirror}$$

The energy density at the mirror, which is proportional to the sensor signal, will be closely related to the solid angle subtended by the mirror. By choosing either $$\frac{A}{f^2}$$

for the former case or $$\frac{A}{f^2}$$

cos $\alpha$ for the latter case, the size of the solid angle, and therefore the weighting of each optical means for each zone of coverage may be determined.

According to another embodiment of the invention, said plurality of optical means mounted in front of said infrared sensor consists of a plurality of concave mirrors in combination with a plurality of Fresnel lenses, preferably the Fresnel lenses covering the distant zones of coverage and the concave mirrors covering the closer ones.

According to another embodiment of the invention, the plurality of optical means mounted in front of said infrared sensor comprise eleven concave mirrors as optical focusing means. Assume the solid angle of the mirror aimed at the zone of coverage having the greatest range from the infrared detector is defined as being 100%; in this case, the solid angle of the mirror corresponding to the next closer zone of coverage would be also approximately 100%, and the solid angles of the mirrors corresponding to the two next near zones of coverage would be approximately 48% and the solid angles of the mirrors corresponding to the following zones of coverage would be about 44%, then 28%, 30%, 42% and 49% respectively; and the solid angle of the mirror corresponding to the nearest zone of coverage would be about 143%.

BRIEF DESCRIPTION OF THE DRAWINGS

The invention will be better understood and objectives other than those set forth above will become apparent when consideration is given to the following detailed description thereof. Such description makes reference to the annexed drawings. Throughout the various figures of the drawings the same reference characters have been generally used to denote the same or analogous components.

DETAILED DESCRIPTION OF THE PREFERRED EMBODIMENTS

Describing now the drawings, it is to be understood that to simplify the showing thereof, only enough of the structure of the infrared intrusion apparatus has been illustrated herein, as is needed to enable one skilled in the art to readily understand the underlying principles and concepts of the present invention.

Figure 1:
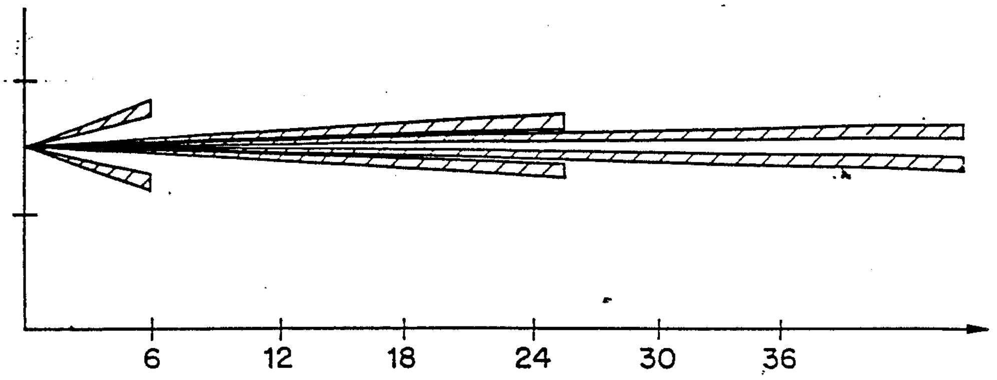
FIG. 1 (PRIOR ART)
FIG. 1 is the top view of a zone pattern of a mirror arrangement of an infrared intrusion detector of the prior art.
Figure 2:
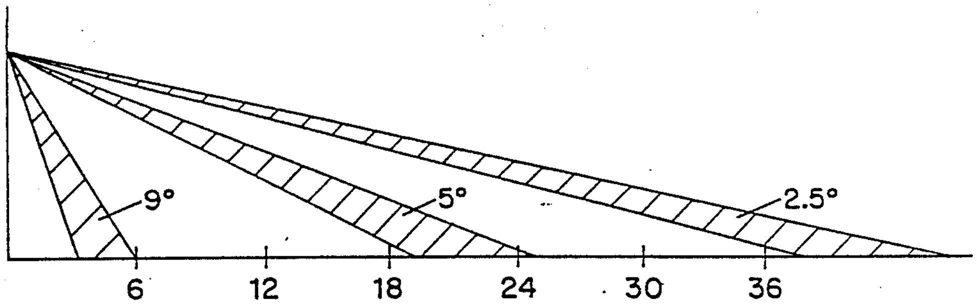
FIG. 2 (PRIOR ART)
FIG. 2 is the side view of a field pattern of a mirror arrangement of an infrared intrusion detector of the prior art.

Turning now specifically to FIGS. 1 (top view) and 2 (side view) of the drawings, it will be apparent that the patterns of beam coverage of an infrared intrusion detector of the prior art show that the coverage of the area to be protected is not sufficiently continuous, i.e. not free of gaps.

Figure 3:
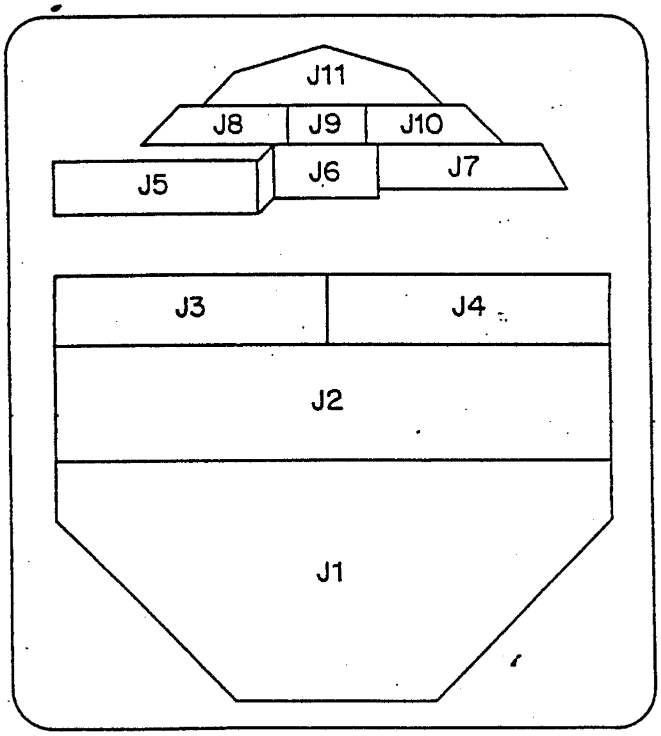
FIG. 3 is the front view of the mirror arrangement of an infrared intrusion detector of the invention.
Figure 4:
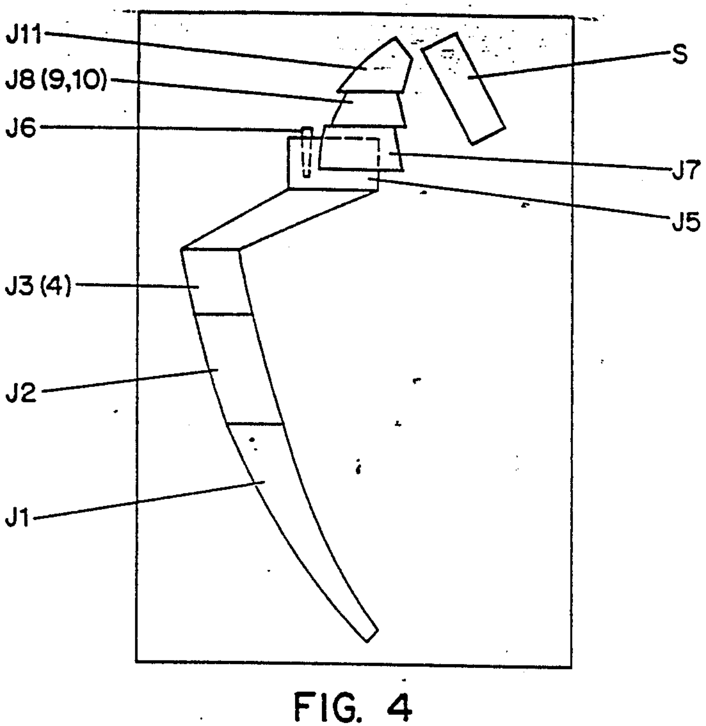
FIG. 4 is the side view of the mirror arrangement of FIG. 3.

FIG. 3 shows a front view of an embodiment of an infrared intrusion detector according to the invention; the optical focusing means are in this special case the concave mirror elements J1 to J11 which are constructed and arranged in such manner that the radiation reaching the mirror from the different zones of coverage I1 to I11 is focused onto the infrared sensor S (see FIG. 4). Preferably, the surface of said mirrors is shaped in the form of a section of a paraboloid.

The outer boundaries of the surfaces of the concave mirrors J1 to J11 which are responsible for the focusing of infrared radiation are arranged more or less regularly and form a solid angle with the sensor (S), which is located in the focal point of said mirrors. As is shown in FIG. 4, the sensor is arranged near the mirror elements J6, J9 and J11. The mirror element J1 is furthest away; it focuses the radiation from the zone of coverage I1 located at the largest distance from the detector onto the sensor (S). Although the mirror elements J8 to J11 corresponding to the zones of coverage I8 to I11 nearest to the detector have a small surface, the nearness to the sensor S effects their large solid angles.

The mirror elements J1 to J11 are chosen and arranged so that the zones of coverage I1 to I11 cover the supervised space in a vertically overlapping manner. Their size and distance from the sensor S, as well as the solid angle they form with the sensor S is constructed so that the sum of the total infrared radiation emanating from an intruder focused into the sensor S from the zones of coverage I1–I11 is constant, when a moving, infrared radiation emitting object in the form of an upright human being crosses the curtain-like protection zone.

In the present example, this is achieved by choosing the size of the mirror elements so that the value of the solid angle formed by the infrared sensor S at the vertex, and the outer boundaries of the coverage of the corresponding and optical focusing means J1–J11 is a function of the distance of the areas of coverage I1–I11 from the infrared detector. The solid angles of the optical means J1, J2 and J11, which correspond to zones of coverage with the furthest (I1, I2) and closest (I11) range are the largest, and the solid angles of the optical means J7, J8 which focus the energy from zones of coverage that have distances to the detector corresponding to middle ranges (I7, I8), are the smallest ones.

FIG. 4 shows the side view of the mirror arrangement J1 to J11 of an infrared intrusion detector as shown in FIG. 3. The mirror elements J8, J9, J10, and J3 and J4 are arranged in a horizontal row, so that in a side view (FIG. 4) they cannot be seen as separate elements. However, well visible is that the sensor S is very close to the mirror element J11 and therefore, even though its surface is relatively small, it subtends a very large solid angle. Whereas the mirror element J1 has the largest surface area, because of the large distance to the sensor S, the resulting solid angle is smaller than the solid angle of the mirror element J11.

The relative size of the solid angles which are subtended by the mirror elements J1–J11, with respect to sensor S, in other words, their different weights are as shown in Table 1.

TABLE 1

| | | |
|---|---|---|
| J1 | 100% | |
| J2 | 100% | |
| J3 | 48% | |
| J4 | 48% | |
| J5 | 44% | |
| J6 | 44% | |
| J7 | 28% | (Minimum) |
| J8 | 30% | |
| J9 | 42% | |
| J10 | 49% | |
| J11 | 143% | |

The solid angles of the mirror elements J1, J2, that correspond to the zones of coverage I1, I2, which supervise the furthest range from the detector, are arbitrarily assigned a relative weight of 100%.

The focal length and/or aperture of the different mirror elements J1 to J11 are adjusted to the corresponding ranges of the individual zones so that the signal that impinges upon the sensor S from any detection zone is maximal within the "used range of coverage" of this zone. By "used range of coverage" of any of the protection zones I1 to I11, it is to be understood the range within which the infrared radiation of an upright walking person contributes by geometrical reasons from this zone a main part of the sensor signal. It should be noted that the sum of the infrared energy summed by the various optical means from an upright walking person crossing zones I1 to I11 is what is kept nearly constant.

In the following table, the used ranges of coverage, that could also be defined as the "main ranges", and the focal length of the corresponding mirror elements J1 to J11 are given for the zones of coverage I1 to I11 to achieve the goals of the invention.

| I | Main Range [m] | Focal Length [mm] |
|---|---|---|
| 1 | 10 to 25 | 40 |
| 2 | 7–18 | 30 |
| 3 | 4–11 | 27 |
| 4 | 2–7 | 27 |
| 5 | 1.5–5 | 15 |
| 6 | 1–3 | 13 |
| 7 | 0.5–2.5 | 12 |
| 8 | 0.5–1.5 | 10.5 |
| 9 | 0.5–1 | 10 |
| 10 | 0–0.75 | 9.5 |
| 11 | 0–0.5 | 7.8 |

Figure 5:
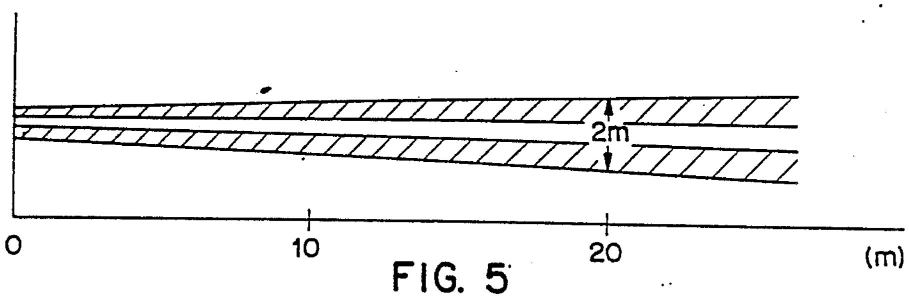
FIG. 5 is a cross sectional (top) view near the floor of the patterns of beam coverage of an infrared intrusion detector fixed about 2.5 m above the floor and comprising the mirror arrangement of FIGS. 3 and 4.
Figure 6:
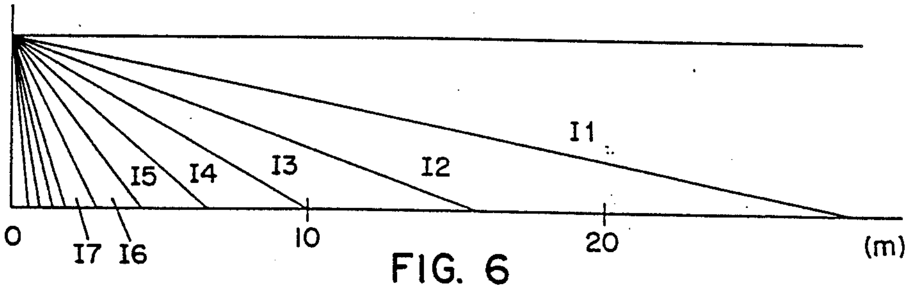
FIG. 6 is a side view of the patterns of beam coverage of FIG. 5.
Figure 6A:
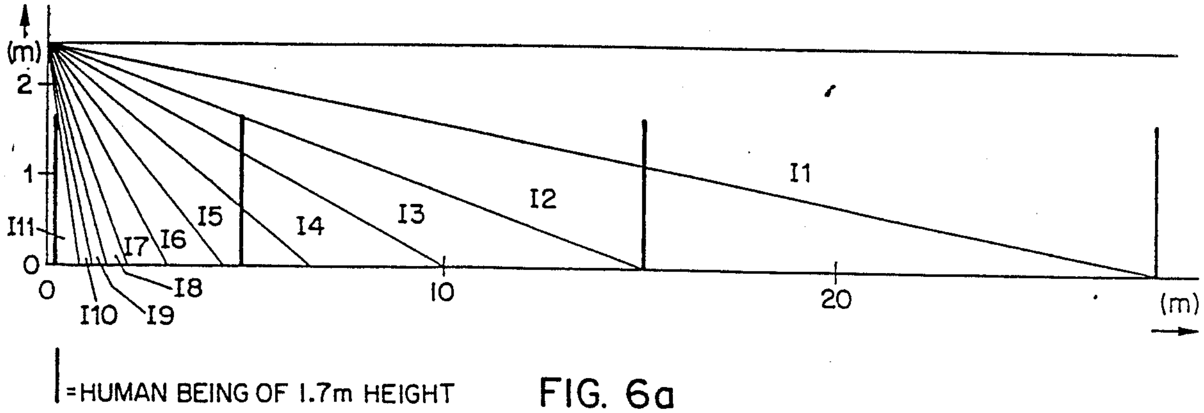
FIG. 6a is a depiction of a 1.7 meter target (human being) located at four different range locations with respect to the infrared detector. The detector is located 2.5 meters above the floor. Zones I1 through I11 are the same zones of coverage as those shown in FIG. 6.

FIGS. 5, 6 and 6*a* are drawings of the entirety of the zones of coverage of an infrared intrusion detector according to the invention and as depicted in FIG. 3 and FIG. 4.

FIG. 5 is a top view and FIG. 6 and 6*a* side views. From the top view it can be seen that the zones of coverage are narrow, and from the side view (FIG. 6 and 6*a*) it is perceptible that the zones of coverage I1 and I2 are far-reaching, i.e. long range. In FIG. 6, the separate zones of coverage I1 to I11 are shown for an infrared intrusion detector mounted at a height of approximately 2.5 m. As shown in FIG. 6a, it is perceptible that an intruder emitting infrared radiation having approximately the shape of an upright human being emits radiation into different zones if it crosses the middle zones I2, I3, I4, whereas if it crosses for example the furthest zone I1, only one zone of coverage receives radiation from said object. Furthermore, an intruder crossing zone I11, would again only contribute infrared energy in only one zone. As it is the objective of this invention to provide a constant output from the sensor in response to the intruder being in any one or more of the I1 through I11 zones, the weights shown in Table 1 are used to insure that the energy summed by the optical means onto the sensor is constant as zones I1 through I11 are traversed by said intruder.

Figure 7:
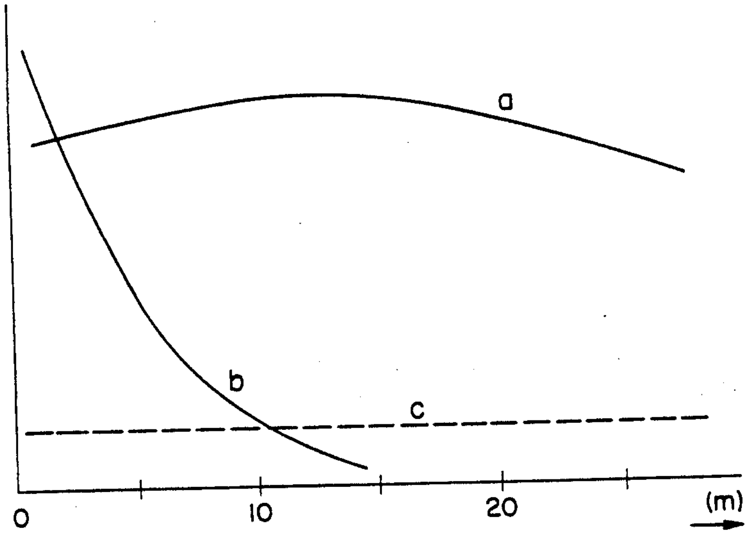
FIG. 7 is a graph of the response of the infrared intrusion detector of the invention compared with an infrared intrusion detector of the prior art, as a function of range. It is the response of the detector to this 1.7 meter target that is range insensitive.
Figure 8A:
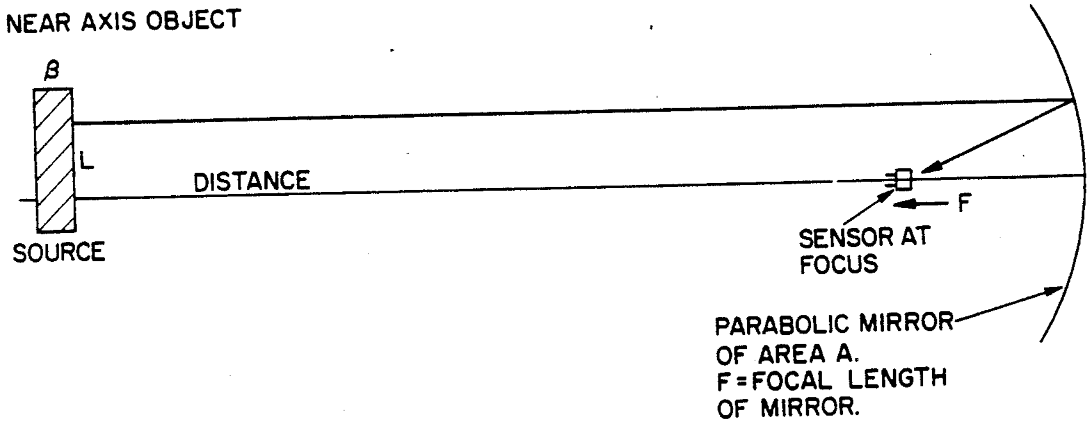
FIG. 8a and 8b illustrate the variables used in the computation of the solid angles used for determining the physical extent of the optical means central to this invention.
Figure 8B:
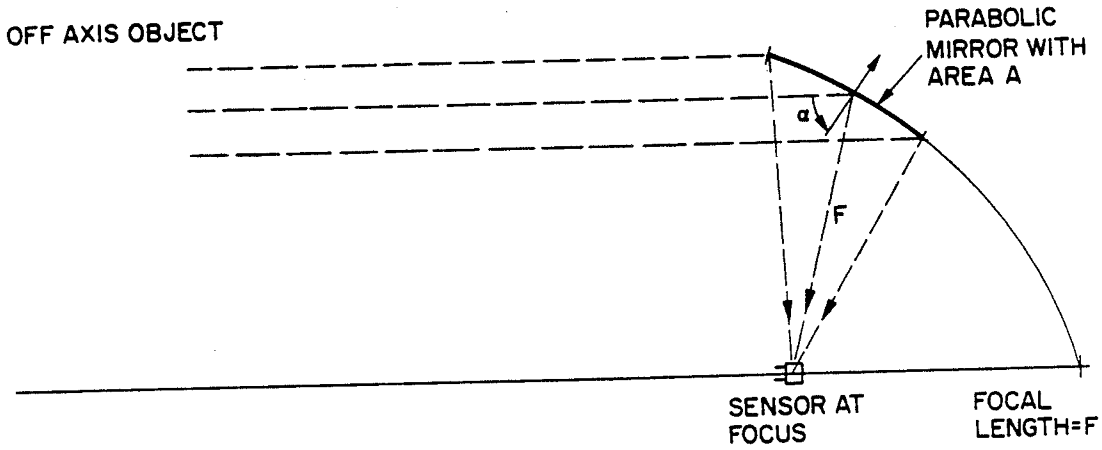
Figure 4:
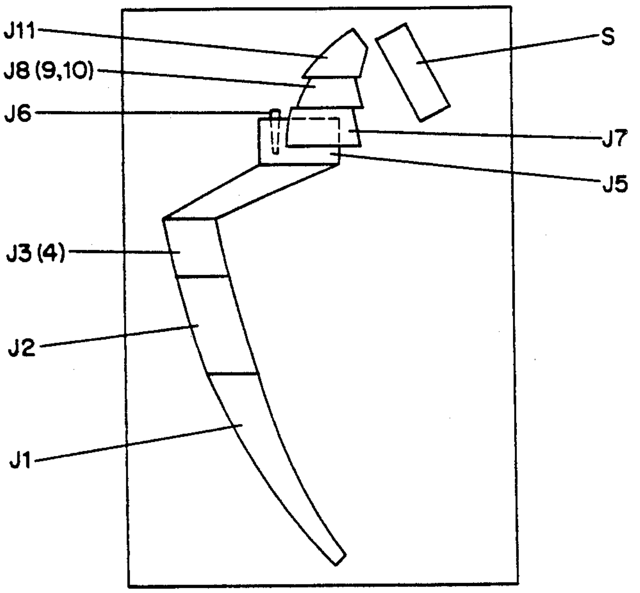
Figure 5:
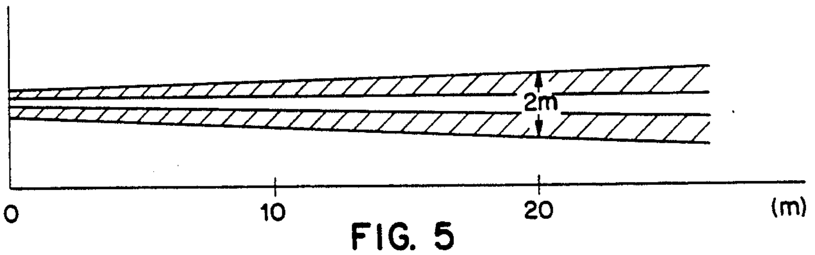
Figure 6:
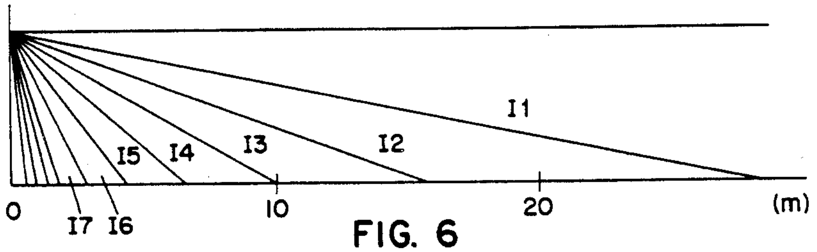
Figure 6A:
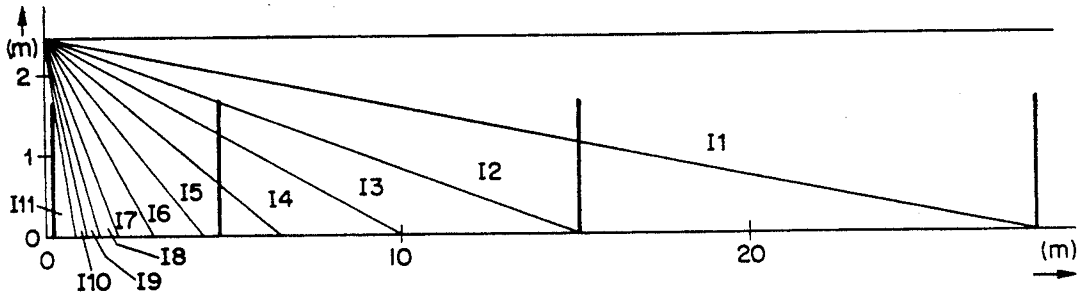

In FIG. 7, the coverage characteristics of two different infrared intrusion detectors for infrared emitting objects is plotted as a function of the range of the objects to the detectors. The sensor signal (in relative units) is shown on the ordinate axis; and on the abscissa is depicted the distance (in meters) of the infrared radiation emitting object from the detector. Curve (b) corresponds to an infrared intrusion detector according to EP-A-No. 0'262'241 (corresponding to U.S. Pat. No. 4,740,701), curve a) to an infrared intrusion detector according to the present invention. Curve (c) shows the detection threshold in the same units. The curves are representative of an infrared radiation emitting object with approximately the shape and size of an upright human being crossing one or more zones of coverage J1–J11 at different distances from the detector and having approximately a speed of 60 cm/s.

It is obvious that the coverage of the prior art infrared detector is (strongly) dependent upon the distance of the object from the said detector. In contrast with this finding the coverage of an infrared intrusion detector according to the present invention is nearly equal for all distances.

While there are shown and described present preferred embodiments of the invention, it is to be understood that the invention is not limited thereto, but may otherwise variously be embodied and practiced within the scope of the following claims.

We claim:

1. In a passive infrared intrusion detector for forming a continuous curtain-like zone of protection without a gap and capable of substantially uniform infrared radiation sensitivity across the entire field of coverage of the detector, comprising an infrared sensor for detecting a change in infrared radiation impinged on the infrared sensor by an intruder, a plurality of optical means mounted in front of said infrared sensor for receiving said infrared radiation from the body of said intruder and focusing said infrared radiation on said infrared sensor, and an evaluation means coupled to said infrared sensor for actuating a signal when said infrared sensor detects said radiation change, wherein the improvement comprises:

said plurality of optical means arranged to receive infrared radiation emanated from a plurality of angular regions of space, said angular regions of space defining an overlapping pattern of zones of coverage blanketing a corridor-like room to be monitored, each of said optical means extending over a selected solid angle as viewed from said infrared sensor optical means, said selected solid angle of each of said optical means having an extent varying with the range of the corresponding zone of coverage in such manner the sum of radiation impinging upon the infrared sensor from an infrared radiation emanating object from all of said optical means is constant, independent of said object's range from the infrared detector, wherein said optical means are constructed in such manner that said solid angles are a function of the range of said zone of coverage from the infrared detector, said solid angles of those optical means corresponding to the zones of coverage having the greatest range and of those optical means corresponding to the zones of coverage having the least range from the infrared detector have the largest extent and said solid angles of those optical means corresponding to the zones of view having middle ranges have the smallest extent.

2. A passive infrared intrusion detector according to claim 1 wherein the optical means consist of concave mirrors.

3. A passive infrared intrusion detector according to claim 2 wherein the optical means consist of between seven and fifteen concave mirrors.

4. A passive infrared intrusion detector according to claim 1 wherein the optical means consist of Fresnel lenses.

5. A passive infrared intrusion detector according to claim 4 wherein the optical means consist of eleven Fresnel lenses.

6. A passive infrared intrusion detector according to claim 2, comprising as optical means eleven concave mirrors and further characterized in that if said solid angle subtended by said mirror corresponding to the zone of coverage having the greatest range from the infrared detector is defined as 100%, said solid angle of said mirror corresponding to the next zone of coverage having the nearer range from the infrared detector is also circa 100%, that said solid angle of said mirrors corresponding to the next two zones of coverage having the nearer range from the infrared detector are circa 48%, and that said solid angle of said mirrors corresponding to the following nearer situated zones of coverage are circa 44%, circa 44%, circa 27%, circa 30%, circa 42%, circa 49% and that said solid angle of said mirror corresponding to the zone of coverage having the least range from the infrared detector is circa 143%, respectively.

7. A passive infrared intrusion detector according to claim 1 wherein the optical means consist of a plurality of concave mirrors in combination with a plurality of Fresnel lenses, where the Fresnel lenses correspond to the zones of coverage having the greater range from the infrared detector and the concave mirrors correspond to the zones of coverage having the nearer range from the infrared detector.

* * * * *

UNITED STATES PATENT AND TRADEMARK OFFICE
CERTIFICATE OF CORRECTION

PATENT NO. : 4,990,783

DATED : February 5, 1991

INVENTOR(S) : Muller et al.

It is certified that error appears in the above-identified patent and that said Letters Patent is hereby corrected as shown below:

Cover page of patent correctly states "3 Drawing Sheets' But Sheet 2 has been duplicated as Sheet 4; and Col. 3, line 15, after "dimension" insert --B x L will be imaged on the sensor with dimensions b x l,--.

Signed and Sealed this

Twenty-eighth Day of April, 1992

Attest:

HARRY F. MANBECK, JR.

Attesting Officer

Commissioner of Patents and Trademarks